INVENTOR.
WESLEY P. DOWHAN,
BY
Berman, Davidson & Berman.
ATTORNEYS.

United States Patent Office 3,579,408
Patented May 18, 1971

3,579,408
ORNAMENTAL DEVICE FOR ATTACHMENT TO WIRE SPOKED WHEELS
Wesley P. Dowhan, 46 N. Water St., P.O. Box 272,
Warehouse Point, Conn. 06088
Filed June 21, 1968, Ser. No. 739,102
Int. Cl. D04d 7/04; B60b 7/04
U.S. Cl. 161—7
6 Claims

ABSTRACT OF THE DISCLOSURE

Ornamental device for attachment to a wheel having wire spokes, said device comprising: a central, segmented annular disc; a plurality of fan-shaped blades; means for connecting the small ends of said blades to said disc, and means securing the wide ends of said blades to the spokes of a wheel.

---

It is an object of this invention to provide means for the attractive ornamentation of wire spoked wheels, particularly bicycle wheels.

It is a further object of this invention to provide means as aforesaid which may be properly and securely applied without the necessity for removing the wheel from its frame.

It is a further object of this invention to provide means as aforesaid which will not effect the balance of the wheel and which will be sufficiently lightweight so as not to impose undue additional strain on the rider.

The above and other objects will be made clear from the following detailed description taken in connection with the annexed drawing, in which.

The bicycle long has been, is now, and promises to continue to be a favorite in the age group 6–14. In this age group, the bicycle is not only a means of transportation but a status symbol, and, as is not uncommon among adult status symbols, its rank within the hierarchy of symbols depends largely on embellishment.

The present invention contributes a maximum of embellishment at minimum cost and effort and it may be added with minimum detriment to the performance characteristics of the bicycle itself.

Figure 1:
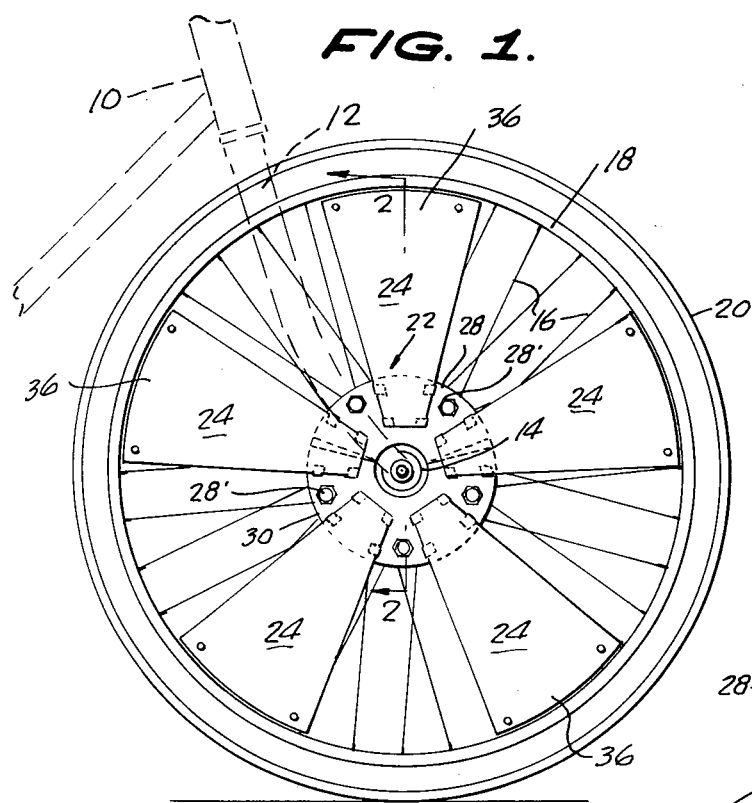
FIG. 1 is a side elevation of a wheel with the ornamentation in place and the bicycle frame shown in dotted outline.

Referring now to FIG. 1, there is shown in dotted outline, the frame of a bicycle 10 having a front wheel fork 12, supporting a hub 14. The hub 14 has the usual spokes 16, the usual rim 18 and a tire 20.

Inside the legs of the fork 12 and outside of the spokes 16 is a central washer-like disc 22. Radially spaced around the disc and secured thereto are a plurality of fan-shaped ornamental blades 24. The blades 24 are secured at their outer margins by fasteners 46 in a manner presently to be described.

Figure 2:
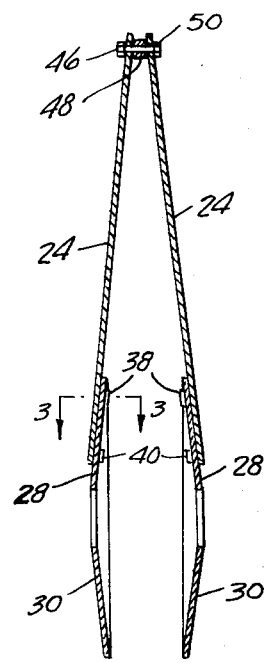
FIG. 2 is a partial section on the line 2—2 of FIG. 1.
Figure 3:
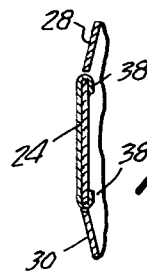
FIG. 3 is a section on the line 3—3 of FIG. 2.
Figure 4:
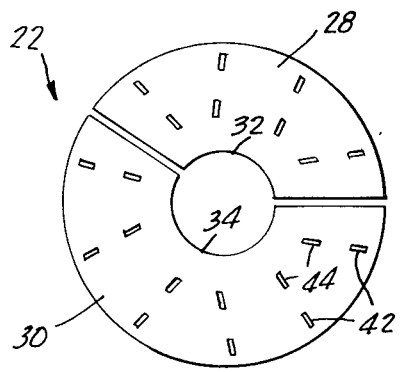
FIG. 4 is a plan view of the central segmented disc forming the basis of the ornamentation.
Figure 5:
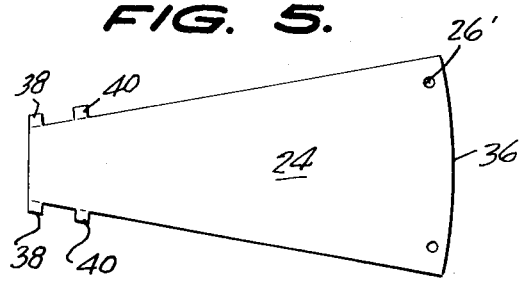
FIG. 5 is a plan view of one of the ornamental blades prior to its installation on the wheel.

As best seen in FIG. 4, the disc 22 is made up of a first segment 28 and a second segment 30. The segment 28 has an arcuate inner edge 32 while the segment 30 has an arcuate inner edge 34. When the segments are assembled, as shown in FIG. 4, the edges 32 and 34 define a circular hub clearing aperture. The reason for the segmental construction is so that the disc may be assembled to lie over the spokes and within the fork without the necessity for dismounting the wheel. As seen in FIGS. 2 and 3, the segments 28 and 30 are slightly dished so that the disc 22, when fully assembled, is frusto-conical. A fan-shaped blade 24 is shown in FIG. 5. An outer margin 36 is arcuate and the blade has openings 26' spaced inwardly from the arcuate edge 36 and located adjacent each of its radial sides. Near its smaller end the blade 24 has, on opposite sides, a pair of inner lugs or tongues 38 and spaced outwardly therefrom an additional pair of similar lugs 40. These preferably are an integral part of the blade 24. As shown in FIG. 4, each of the segments 28 and 30 has an outer series of perforations 42 and an inner series of perforations 44. The perforations are narrow, and rectangular in outline. In assembling the structure, the segments 28 and 30 are juxtaposed inside of the legs of the fork 12 and outside the hub 14. On two of the blades 24 the lugs 38 and 40 are then bent to a position at right angles to the plane of the plate 24. The lugs 40 are arranged to enter and engage the perforation 42 while the lugs 38 are located to enter and engage the inner perforations 44 of the segments 28 and 30.

Figure 6:
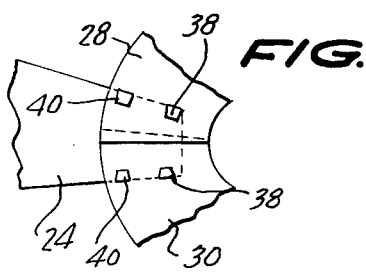
FIG. 6 is a detail in plan showing the engagement of the disc of FIG. 4 with the blade of FIG. 5.

As shown in FIG. 1, the blade 24 is placed to overlie one of the dividing lines between segments 28 and 30 with one set of lugs 38 and 40 engaging perforations 42 and 44 of the segment 28 and with its opposed set of lugs 38, 40 engaging perforations 42 and 44 of the segment 30. The lugs are then bent down, as shown in FIGS. 3 and 6, so as to secure the segments together. A similar blade 24 is then similarly secured over the opposite meeting of the segments 28 and 30. The structure is then fully assembled so far as rigidity is concerned and it only remains to attach the remaining blades 24 to the segments 28 and 30 in the manner just described. Ornamental bolt head simulations 28', as shown in FIG. 1, may be applied to segments 28 and 30. These may be stamped or applied by decals or other means. They provide a desirable ornamental feature.

It now remains to secure the outer edges 36 of the blades 24 to the spokes 16. This is done by means of bolts 46, spacers 48, which surround the bolts 46, and nuts 50, which are threaded onto the bolts 46. Lock nuts, lock washers or other securing means (not shown) may be used as desired. Since the blades 24 are initially planar, engagement of the tongues 38 and 40 with the perforations 42 and 44 results in a slight bowing of the blade 24. The combination of bolts 46 and spacers 48 tends to straighten the blade and put it under tension so that all portions are very securely held. Both the blades and the segment may be made either of light gauge mild steel or slightly heavier gauge aluminum. The latter, of course, has the advantage of reduced weight. The blades may be anodized for color or enameled and may be mutually of different colors which give a pleasing effect when the wheel is in motion.

While certain specific structures have been disclosed and discussed herein, it is not intended to limit this invention to precise details disclosed but only as set forth in the subjoined claims.

What is claimed is:

1. An ornamental device for attachment to a wheel having wire spokes, said device comprising a plurality of arcuate members having juxtapositioned end edges, said members defining a segmented annular disc, a plurality of fan-shaped blades, said blades having first and second ends, the first ends of said blades having a greater lateral width than the second ends of said blades, means for connecting the second ends of said blades to said disc, and means for securing the first ends of said blades to the spokes of a wheel, the blades being disposed outwardly of and extending past the periphery of said disc.

2. The device of claim 1 in, which the second ends of said blades have tongues engaging slots in the members of said discs.

3. The device of claim 1, in which the assembly of said disc member is frusto-conical when assembled and said blades are initially planar but become slightly bowed when secured to the disc.

4. The device of claim 1, in which the second ends of at least two of said blades overlie the juxtapositioned edges of arcuate disc members and are secured to the last-named members.

5. The device of claim 4, in which the assembly of said disc members is frusto-conical when assembled and said blades are initially planar but become slightly bowed when secured to the disc.

6. The device of claim 4, in which the second ends of the blades have tongues engaging slots in the members of said disc.

References Cited
UNITED STATES PATENTS

| | | | |
|---|---|---|---|
| 1,481,363 | 1/1924 | Hall | 301—37(SA) |
| 3,390,917 | 7/1968 | Tilghman et al. | 301—37(SA) |
| 3,082,041 | 3/1963 | Hamilton | 301—37(SA) |
| 1,989,839 | 2/1935 | Zeller | 301—37(SA) |

PHILIP DIER, Primary Examiner

U.S. Cl. X.R.

161—13; 301—37SA